F. W. LOVEJOY.
PHOTOGRAPHIC FILM.
APPLICATION FILED APR. 8, 1918.

1,275,989.

Patented Aug. 13, 1918.

WITNESSES:
Donald H. Stewart.
Helen M. Fraser

INVENTOR.
Frank W. Lovejoy,
BY R. L. Stinchfield
ATTORNEY.

UNITED STATES PATENT OFFICE.

FRANK W. LOVEJOY, OF ROCHESTER, NEW YORK.

PHOTOGRAPHIC FILM.

1,275,989.  Specification of Letters Patent.  Patented Aug. 13, 1918.

Application filed April 8, 1918. Serial No. 227,404.

*To all whom it may concern:*

Be it known that I, FRANK W. LOVEJOY, a citizen of the United States of America, residing at Rochester, in the county of Monroe and State of New York, have invented certain new and useful Improvements in Photographic Films, of which the following is a full, clear, and exact specification.

This invention relates to photographic film and more particularly to sheets of such film associated with backing strips in cartridges, packs and similar articles of manufacture. The principal object of my invention is to provide the film adjacent each section to be exposed (commonly called a picture area) with a latent identifying symbol which corresponds to a printed mark on the backing strip, such latent symbol developing during the normal treatment of the film into a uniformly neat and legible means of identification.

After roll films and film packs have been developed, it is very desirable to identify each of the negative views appearing in the various picture areas thereof. In order to accomplish this result conveniently, the photographer should know at the time of exposure which of the picture areas he is using for that particular view and should also be able to recognize that same area after development. The identification of the picture area at the time of exposure is generally made by means of printed numbers on the backing strips in the case of roll films and on the pulling tabs in the case of film packs. But the backing strips or paper tabs become separated from the film during development and subsequent fluid treatment, so that the different picture areas can no longer be identified. The photographer at the time of exposure may have noted, for instance, that the views on areas 8, 9 and 10, show statues of Washington, Jefferson, and Franklin, respectively; but after the backing is removed he cannot readily tell which areas are 8, 9 and 10 and so cannot identify or distinguish between the negative views of the confusingly similar statues.

I have found that this difficulty of identification can be overcome and the necessary data supplied by providing in or adjacent each picture area a latent image of a numeral corresponding to the numeral on the backing paper or tab which identifies that area. These latent images develop into neat legible numerals during the regular treatment of the films so that each view is clearly identified by its number. For instance, if the photographer noted, when taking the pictures, that the views on areas 8, 9 and 10 showed statues of Washington, Jefferson, and Franklin respectively, he can, after development, differentiate between these similar views by reading the developed identifying numeral thereon.

These latent images of the numerals are printed on the film by the manufacturer, preferably using machines which light print the characters uniformly to just the right extent called for by the characteristics of that particular sensitive film. The article of manufacture, such as a roll film cartridge or film pack, is thus sold to the consumer complete with coöperating numerals on the backing paper and film,—the first visible the other invisible but developable. This prepared article makes unnecessary any complicated numbering mechanism in the camera itself, which mechanism, if it depends upon light from a picture-taking exposure, is sure to fail when deep shadows in the subject cause insufficient light to reach it in the camera.

Figure 5:
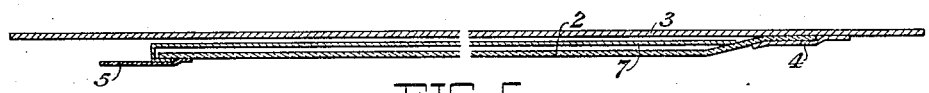
Figure 6:
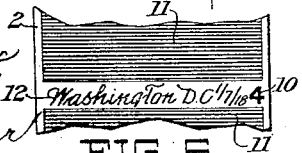

Referring now to the examples of my invention in the drawing, I have shown at 1 a conventional flanged spool upon which are wound a sheet of film 2 and a strip of backing paper 3. The latter may be joined by connecting strips 4, while the film has at one end a leader 5. The backing paper may have a sticker-band 6 thereon. A sheet 7 of material for receiving inscriptions, such as carbon transfer paper, may be located between film 2 and backing paper 3, as shown in Fig. 5.

Upon the outerside of the backing paper are sets of printed consecutive numerals 8 which are successively visible in the camera to identify the picture areas of film 2 in the well known way. Along the medial line of the film are a series of latent light-printed images 9 of numerals corresponding to numerals 8 and so located as to come adjacent the picture areas which they identify after development. Of course, these latent images are invisible until development but have been shown diagrammatically in the drawing by double-line numerals for convenience.

Figure 3:
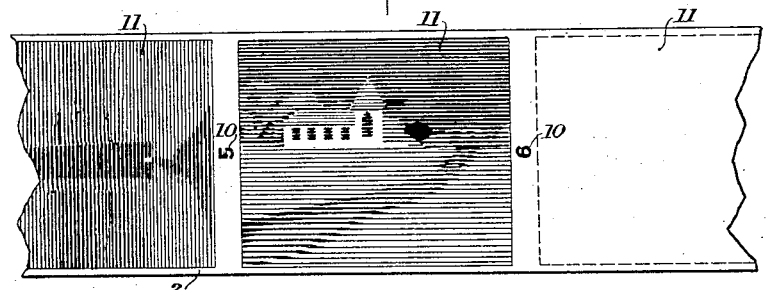
Figs. 3 and 6 are diagrammatic views of pieces of developed film resulting from my invention.
Figure 4:
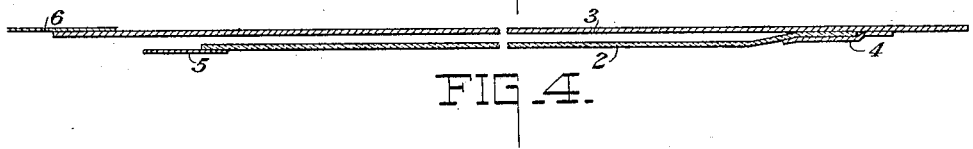
Figs. 4 and 5 are longitudinal sectional views of two species of stretched roll film elements in which my invention may be embodied.

After development, these numerals appear as black clear figures; thus in Fig. 3 developed numerals 10 identify the adjacent picture areas 11. These numerals may moreover be located along the edge of the film instead of between the views and may be located adjacent an inscription space 12, as shown in Fig. 5, so that identifying symbols will automatically develop adjacent each view whether or not the photographer makes an inscription on the film. Or the numeral may supplement the inscription.

Figure 1:
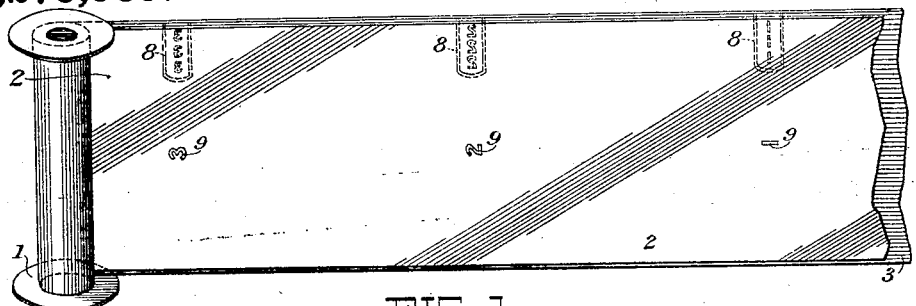
Figure 1 is a perspective view, parts being broken away, of a partially unrolled film cartridge embodying my invention, certain latent invisible symbols being diagrammatically indicated by visible characters.
Figure 2:
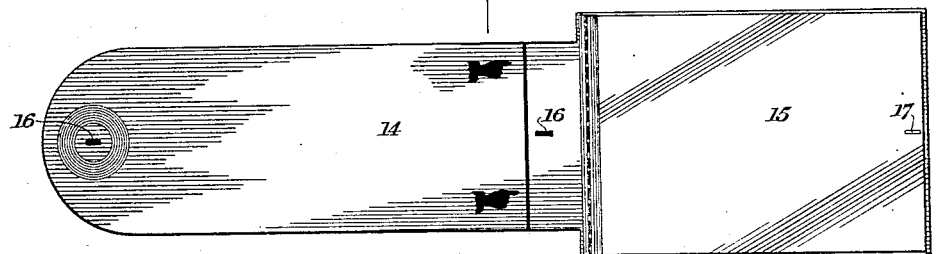
Fig. 2 is a plan view of a film pack unit embodying my invention.

In Fig. 2 I have shown a film pack unit or element in which a backing strip 13, having a pulling tab 14, is attached to a film sheet 15. The tab has visible numerals 16 printed thereon, while the sheet carries a latent image 17 of a corresponding numeral.

While I prefer to use numerals as the coöperating visible and latent characters in my improved article of manufacture, any other convenient identifying symbols may be used. Moreover the position of the latent images of the numerals is not vital so long as they serve to conveniently identify the picture areas when developed.

What I claim is:—

1. As an article of manufacture, a sensitive photographic film sheet having an area thereon to receive a picture, and a backing strip for said film, said backing strip having a visible symbol thereon for identifying said area, and said film sheet having therein adjacent said area a latent developable symbol corresponding to said visible symbol on said strip.

2. As an article of manufacture a sensitive photographic film sheet having areas to receive a series of pictures, and a backing strip for said film, said backing strip having thereon a series of visible identifying symbols and said film sheet having therein adjacent said areas a series of latent developable symbols corresponding to said symbols on said strip.

Signed at Rochester, New York, this 30th day of March 1918.

FRANK W. LOVEJOY.

Copies of this patent may be obtained for five cents each, by addressing the "Commissioner of Patents, Washington, D. C."